G. PLANCQ.
CUTTING AND WELDING APPARATUS.
APPLICATION FILED DEC. 16, 1913.
1,220,548.
Patented Mar. 27, 1917.
2 SHEETS—SHEET 2.
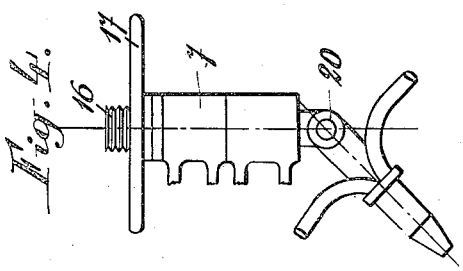
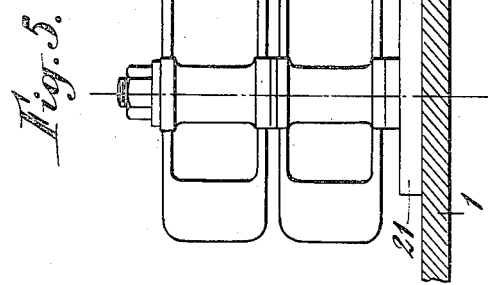
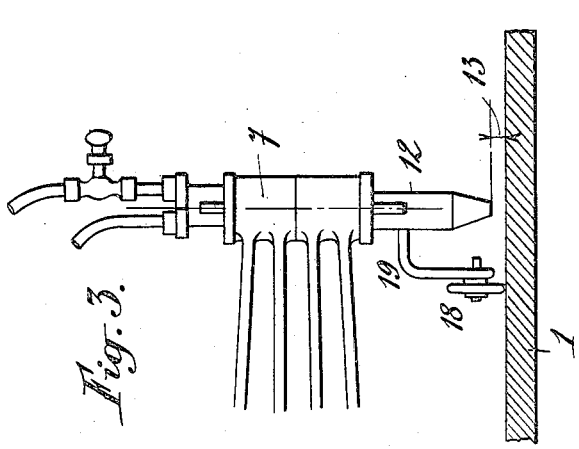
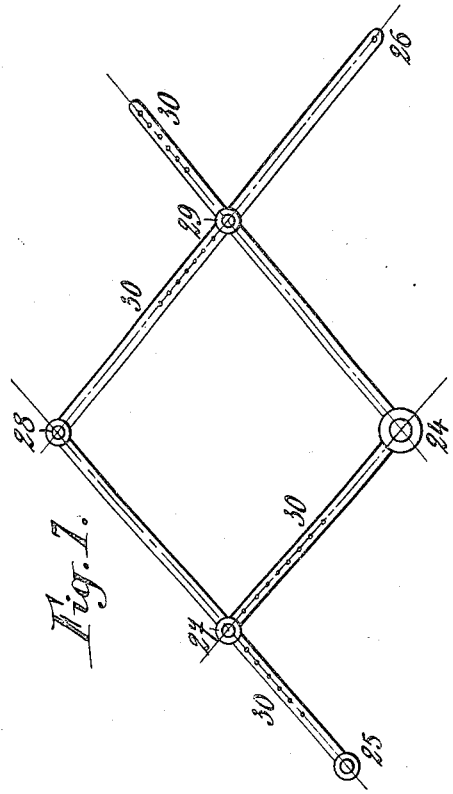
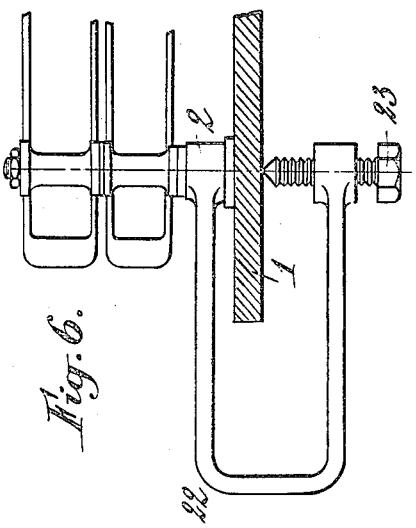
Witnesses:
R. J. Hulsizer.
C. H. Potter.
Inventor Georges Plancq
by Byrnes Townsend & Brickenstein
Attys.

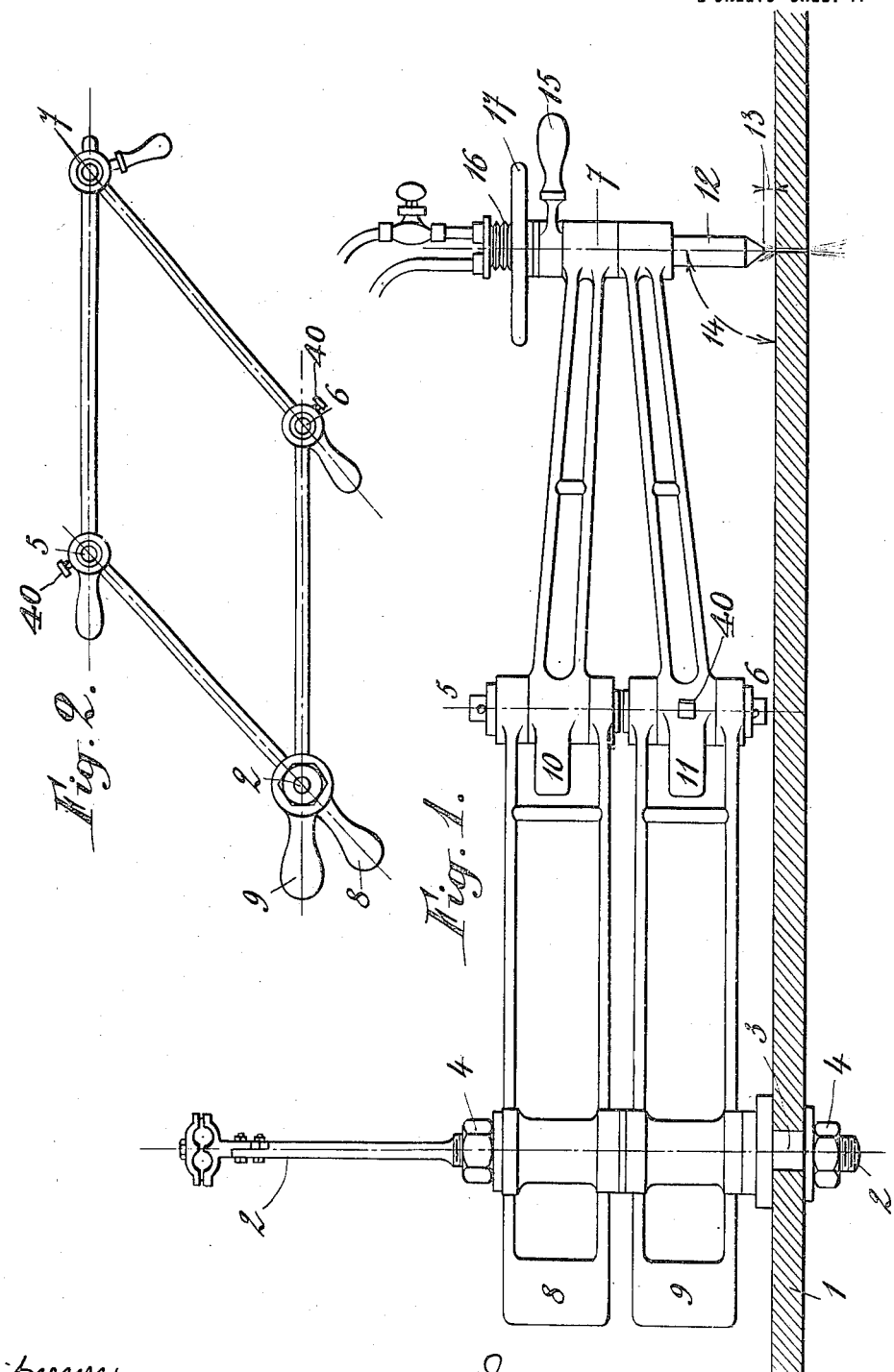

UNITED STATES PATENT OFFICE.

GEORGES PLANCQ, OF KOEKELBERG-BRUSSELS, BELGIUM, ASSIGNOR, BY MESNE ASSIGNMENTS, TO JESSE J. RICKS, OF WINNETKA, ILLINOIS.

CUTTING AND WELDING APPARATUS.

1,220,548.

Specification of Letters Patent.

Patented Mar. 27, 1917.

Application filed December 16, 1913. Serial No. 807,092.

*To all whom it may concern:*

Be it known that I, GEORGES PLANCQ, a subject of the King of Belgium, residing at Koekelberg-Brussels, in the Kingdom of Belgium, have invented certain new and useful Improvements in Cutting and Welding Apparatus, of which the following is a specification.

My invention relates to the well-known cutting and welding torches or blow-pipes used in the application of the oxhydric or other similar processes. It has for its object to secure simple and efficient means for suspending and guiding the torch or blow-pipe when in use, and also for maintaining a constant interval between the cutting or welding nozzle or nozzles and the piece which is to be worked. A further object of my invention consists in providing means for maintaining always the same inclination of the nozzle relatively to the piece to be worked, and also for giving to the operator the greatest facility and commodity for moving the nozzle along a given line.

With these objects in view, my invention does away with great inconveniences of the devices already used for similar purposes, which, generally speaking, do not give quite satisfaction, and allow only movement of the nozzle along straight lines or along the circumference of circles without securing with exactness the maintenance of the distance between the nozzle and the piece to be worked, and of the angle which the nozzle must make relatively to said piece.

My invention essentially consists in new arrangements and combinations of parts as will be hereinafter fully described and pointed out in the appended claims.

In the annexed drawings:

Figure 1 is a side elevation of a suspending and guiding device constructed according to my invention.

Fig. 2 is a top view corresponding to Fig. 1.

Figs. 3, 4, 5 and 6 show several modifications of details.

Fig. 7 is a top view similar to Fig. 2 of a further modification.

Referring to Fig. 1, it has been supposed that the torch or blow-pipe is used to cut a sinuous line on a plate 1 supported horizontally. Upon said plate a shaft or rod 2 is fixed vertically in a hole 3 by means of a nut 4 so as to be maintained rigidly thereon. Said shaft or rod serves as the apex of a jointed parallelogram having the three other apexes 5, 6, 7 which are suitably pivotally jointed together, for instance, by means of sleeves or sockets having large, longitudinally extended bearing surfaces in order to avoid any distortion in the vertical plane. In Fig. 1, the apexes 5—6 are superposed in such a manner that the sides 2—5 and 2—6 of the parallelogram are also superposed as well as the sides 5—7 and 6—7. The sides 2—5, 5—7 and 2—6, 6—7 are consequently straight lines. Fig. 2 shows the parallelogram in one of its positions of working. Each side of the parallelogram is made of a rigid bar or frame, and the several pivotal connections must be properly constructed, as already stated, in order to avoid any movement or oscillation in the vertical direction. The pivotal connections however, may be provided with ball bearings in order to reduce to a minimum the power required for moving the parallelogram in the horizontal plane. For the same reason the bars or frames of the parallelogram may be balanced by counterweights 8, 9, 10, 11 thus greatly facilitating the manipulation of the apparatus. In these conditions, the nozzle 12 placed at the center of the sleeves forming the pivotal connection 7 will obviously be maintained permanently at the same distance 13 relatively to the plate 1, and the angle 14 of the axis of the nozzle 12 with the plane of the plate 1 will also be maintained constant.

Further, owing to the possibility of varying the parallelogram in the horizontal plane, it is possible to follow with the apex 7 carrying the nozzle 12, any given line whatever its shape may be, simultaneously maintaining exactly the nozzle at the desired distance and under the required angle relatively to the plate. The movement of the apex 7 may be guided along the desired line, by aid of a handle 15.

In view of the fact that the plate 1 which is to be worked may be distorted, either previously to the beginning of the operation, or during the operation itself, on account of the heat produced by the nozzle, it is advisable to provide means for controlling the position of the nozzle, that is to say the distance 13 and the angle 14, either before the beginning of the operation or during the operation. The distance 13 may be varied or controlled, for instance, by means of a screw 16 acted upon by a hand wheel 17. The screw, when it is raised by the handwheel, carries with it the nozzle 12 with which it is integral.

Fig. 3 shows another arrangement serving for the same purpose. In said modification the nozzle 12 slides in the sleeves or sockets forming the apex 7 of the parallelogram and the distance of the nozzle relatively to the plate is controlled by a wheel 18 mounted on a support 19 fixed to the nozzle 12.

The angle 14 of the nozzle to the plate may be controlled, when it is found advisable, by means of a supplementary pivotal connection 20, arranged as shown in Fig. 4 at the end of screw 16.

The rod or shaft 2 need not necessarily to be fixed upon the plate, in the manner shown in Fig. 1. Further examples of attaching means are shown in Figs. 5 and 6. In the example in Fig. 5, the plate need not be bored, the device being provided with a supporting pillar 21, the weight of which is sufficient to hold the device automatically in position. In the arrangement illustrated in Fig. 6, a U-shaped frame 22 is provided, the lower end of which is provided with a screw 23 adapted to hold the rod 2 in position. The rod or shaft 2 may receive any given position and need not necessarily be vertical. Further it must be understood that any appropriate means can be used in coöperation with the suspending and guiding device in order to guide the nozzle along a predetermined line. So, for instance, a rule may be used to guide along a straight line. In order to trace a circle, one of the apexes 5—6 may be fixed in a given position by means of a set screw 40 so as to maintain permanently the radius represented by the line joining the apexes 2 and 7. In order to trace an ellipse, it is only necessary to take a fixed point on each side of the shaft or rod 2 and to trace the ellipse with the aid of a string by the usual method; when it is desired to cut along a curve, the nozzle may be guided along a corresponding caliber or model.

The above described construction of suspending and guiding means for cutting and welding torches or blow-pipes can be modified very easily so as to realize a device having the advantages and properties of a pantograph. In this case, certain of the sides of the jointed parallelogram are provided with extensions, and the position of the shaft 2 must be displaced as shown in Fig. 7. In this construction, the shaft 2 is placed at the apex 24, and the nozzle is mounted at the end 25 of the extension of one side of the parallelogram. The adjacent side of the parallelogram is extended in the same manner and is provided with a tracing-point 26 which is guided by the operator on the model. The jointed apexes 5—6—7 (Fig. 2) of the parallelogram are then disposed at the points 27, 28, 29 (Fig. 7). The sides of the parallelogram as well as their extensions are provided with holes 30 for varying the scales.

This construction may be used advantageously to repeat at the same scale or at a different scale the outline which the operator follows with the tracing-point 26 on the model.

Having thus described my invention, what I claim is:

1. Cutting and welding apparatus, comprising a pantographic frame pivotally supported at one of its corners and carrying a blowpipe at the opposite corner, said frame having pivotal connections at the intermediate corners, and means for making the connections at said intermediate corners rigid.

2. Cutting and welding apparatus, comprising a frame, a support therefor, and a blowpipe, said frame comprising two pairs of arms, one pair being pivoted at one end one above the other upon said support and the other pair being pivoted at one end one above the other upon said blowpipe, pivotal connections between the free ends of the upper arms and between the free ends of the lower arms, respectively, said lower arms and their pivotal connection being out of the path of movement of said upper arms and their pivotal connection.

3. Cutting and welding apparatus, comprising a frame and a support therefor, a blowpipe carried by said frame on one side of said support, and a counterbalance carried by said frame on the other side of said support.

4. Cutting and welding apparatus, comprising a support, a frame carried by said support having an elongated articulated portion, a blowpipe carried by the articulated portion of said frame, and a counterbalance for maintaining the end of the blowpipe in its proper plane parallel to the work.

5. Cutting and welding apparatus, comprising a support, a pantographic frame pivotally attached at one of its corners to said support and carrying a blowpipe at the opposite corner, and a weighted extension on said frame at the side of said support opposite the blowpipe.

6. Cutting and welding apparatus, comprising a support, a pantographic frame pivotally attached at one of its corners to said support and carrying a blowpipe at the opposite corner, said frame having pivotal connections at the intermediate corners, the pivots of said frame being vertical and having longitudinally extended bearings.

7. Cutting and welding apparatus, comprising a support, a pantographic frame pivotally attached at one of its corners to said support and carrying a blowpipe at the opposite corner, the pivots of said frame being vertical and having longitudinally extended bearings, and a counterbalance on said frame adjacent said support.

8. Cutting and welding apparatus, comprising a support, a frame secured to said support, a blowpipe slidably mounted in said frame, threads on said blowpipe above said frame, and a nut on said frame engaging said threads to cause when turned said blowpipe to slide in said frame.

9. Cutting and welding apparatus, comprising a support, a frame secured to said support and carrying a blowpipe, said blowpipe having a nozzle pivoted to swing in a plane including the axis of said blowpipe.

10. Cutting and welding apparatus, comprising a support, a frame secured to said support, a blowpipe slidably mounted in said frame, means for moving said blowpipe back and forth in said frame, and said blowpipe having a nozzle pivoted to swing in a plane including the axis of said blowpipe.

In testimony whereof I have affixed my signature in presence of two witnesses.

GEORGES PLANCQ.

Witnesses:
    JACQUES BEDE,
    G. M. HAVIQUEL.